United States Patent
Trott et al.

(10) Patent No.: US 7,433,347 B1
(45) Date of Patent: ***Oct. 7, 2008

(54) BROADCAST SUPERFRAME WITH VARIABLE REUSE AND INTERFERENCE LEVELS FOR A RADIO COMMUNICATIONS SYSTEM

(75) Inventors: Mitchell D. Trott, Mountain View, CA (US); Tibor Boros, San Francisco, CA (US)

(73) Assignee: ArrayComm, LLC, San Jose, CA (US)

( * ) Notice: Subject to any disclaimer, the term of this patent is extended or adjusted under 35 U.S.C. 154(b) by 1171 days.

This patent is subject to a terminal disclaimer.

(21) Appl. No.: 10/187,062

(22) Filed: Jun. 28, 2002

(51) Int. Cl.
*H04B 7/212* (2006.01)
*H04Q 7/20* (2006.01)
*H04J 3/06* (2006.01)

(52) U.S. Cl. ............... 370/347; 370/337; 370/346; 370/350; 455/446; 455/450; 455/453

(58) Field of Classification Search ......... 370/337–350; 455/446–453, 524, 63.1, 63.3, 101, 295, 455/296, 501
See application file for complete search history.

(56) References Cited

U.S. PATENT DOCUMENTS

| | | | |
|---|---|---|---|
| 5,446,756 A * | 8/1995 | Mallinckrodt | 375/130 |
| 5,648,955 A * | 7/1997 | Jensen et al. | 370/252 |
| 5,649,287 A | 7/1997 | Forssen et al. | |
| 5,732,353 A * | 3/1998 | Haartsen | 455/450 |
| 5,787,076 A * | 7/1998 | Anderson et al. | 370/294 |
| 5,818,820 A * | 10/1998 | Anderson et al. | 370/280 |
| 5,995,832 A * | 11/1999 | Mallinckrodt | 455/427 |
| 6,112,080 A * | 8/2000 | Anderson et al. | 455/422.1 |
| 6,112,094 A * | 8/2000 | Dent | 455/452.1 |
| 6,185,440 B1 | 2/2001 | Barratt et al. | |
| 6,298,095 B1 * | 10/2001 | Kronestedt et al. | 375/295 |
| 6,359,923 B1 * | 3/2002 | Agee et al. | 375/130 |
| 6,385,457 B1 * | 5/2002 | Dam et al. | 455/456.2 |
| 6,480,522 B1 * | 11/2002 | Hoole et al. | 375/130 |
| 6,483,826 B1 * | 11/2002 | Åkerberg | 370/335 |
| 6,560,209 B1 * | 5/2003 | Alamouti et al. | 370/330 |
| 6,600,776 B1 * | 7/2003 | Alamouti et al. | 375/147 |
| 2003/0166404 A1 * | 9/2003 | Chuang et al. | 455/453 |

* cited by examiner

*Primary Examiner*—Edan Orgad
*Assistant Examiner*—Venktesh Haliyur
(74) *Attorney, Agent, or Firm*—Blakely, Sokoloff, Taylor & Zafman LLP (57) ABSTRACT

A method and apparatus are provided to enhance the efficiency of reuse of a broadcast channel. In one embodiment, the invention includes sending a first burst of a broadcast channel from a broadcast channel radio subject to a first reuse factor, and sending a second burst of the broadcast channel from the broadcast channel radio subject to a second reuse factor. In another embodiment, the invention includes broadcast channel structure with a primary segment having a first reuse factor, a plurality of secondary segments having a second reuse factor greater than the first reuse factor.

32 Claims, 4 Drawing Sheets

| Frame | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Uplink | | C | | C | | C | | C | | C | | C | | C | | C | | C | | C |
| Downlink | F | C | T | C | B0 | C | B1 | C | B2 | C | B3 | C | B4 | C | B5 | C | B6 | C | B7 | C |
| TX by: | BS0 | | BS0 | | BS0 | | | | | | | | | | | | | | | |
| | BS1 | | BS1 | | | | BS1 | | | | | | | | | | | | | |
| | BS2 | | BS2 | | | | | | BS2 | | | | | | | | | | | |
| | BS3 | | BS3 | | | | | | | | BS3 | | | | | | | | | |
| | BS4 | | BS4 | | | | | | | | | | BS4 | | | | | | | |
| | BS5 | | BS5 | | | | | | | | | | | | BS5 | | | | | |
| | BS6 | | BS6 | | | | | | | | | | | | | | BS6 | | | |
| | BS7 | | BS7 | | | | | | | | | | | | | | | | BS7 | |

SUPERFRAME TRANSMISSION STRUCTURE

FIGURE 4

BROADCAST SUPERFRAME WITH VARIABLE REUSE AND INTERFERENCE LEVELS FOR A RADIO COMMUNICATIONS SYSTEM

BACKGROUND OF THE INVENTION

1. Field of the Invention

The invention relates generally to the field of digital radio signal communications. More particularly, the invention relates to transmitting different bursts of a broadcast channel with different amounts of reuse and to the repeating superframe structure used to transmit the broadcast burst.

2. Description of the Related Art

Mobile radio communications systems such as cellular voice radio systems typically have several base stations in different locations available for use by mobile remote terminals, such as cellular telephones or wireless web devices. Each base station typically is assigned a set of frequencies or channels to use for communications with the remote terminals. The channels are different from those of neighboring base stations in order to avoid interference between neighboring base stations. As a result, the remote terminals can easily distinguish the transmissions received from one base station from the signals received from another. In addition, each base station can act independently in allocating and using the channel resources assigned to it.

Such radio communications systems typically include a broadcast channel (BCH). The BCH is broadcast to all remote terminals whether they are registered on the network or not and informs the remote terminals about the network. In order to access the network, a remote terminal normally tunes to and listens to the BCH before accessing the network. A remote terminal will typically scan a range of likely frequencies when it wants to access the network until it finds the strongest or clearest BCH. It will then use the BCH signal for synchronization and use information in the BCH to request access to the network.

Because the BCH is transmitted to all potential remote terminals within the range of a particular base station, it is typically broadcast omni-directionally or across a wide simultaneous directional range. This causes a great amount of interference and noise. It also consumes resources that might otherwise be used to carry traffic. Existing wireless systems employ a fixed reuse on the broadcast channel. The more resources that are used for traffic, the fewer resources there are left for traffic.

For example, a GSM system typically reuses the broadcast carrier every nine cells. An advantage of the sparse reuse pattern in GSM is the improved reliability of the broadcast channel. Because neighboring cells do not use the channel, the coverage area of the broadcast channel is much improved. This makes handover and network access more reliable. On the other hand, to find the broadcast channel in a GSM system, the user terminal must scan over at least nine frequencies, delaying handover and network access. Furthermore, the sparse reuse pattern in GSM requires that at least nine frequency resources be allocated to the broadcast channel, wasting valuable frequency resources. Recognizing the need to conserve resources, the traffic channels in GSM have a typical reuse pattern of three.

Conversely, IS-95 CDMA reuses the broadcast frequency in every cell. An advantage of this tight reuse pattern is that a user terminal can listen to just one carrier frequency and quickly determine a list of all base stations in communication range. However, in IS-95, as a cell gets loaded, the broadcast channel becomes unreliable and it is much harder for new terminals to even find the broadcast channel from the loaded cell.

SUMMARY OF THE INVENTION

A method and apparatus are provided to enhance the efficiency of reuse of a broadcast channel. In one embodiment, the invention includes sending a first burst of a broadcast channel from a broadcast channel radio subject to a first reuse factor, and sending a second burst of the broadcast channel from the broadcast channel radio subject to a second reuse factor. In another embodiment, the invention includes broadcast channel structure with a primary segment having a first reuse factor, a plurality of secondary segments having a second reuse factor greater than the first reuse factor.

Other features of the present invention will be apparent from the accompanying drawings and from the detailed description that follows.

BRIEF DESCRIPTION OF THE SEVERAL VIEWS OF THE DRAWINGS

The present invention is illustrated by way of example, and not by way of limitation, in the figures of the accompanying drawings in which like reference numerals refer to similar elements and in which.

DETAILED DESCRIPTION OF THE INVENTION

Introduction

The present invention, according to one embodiment, allows for changes in reuse and interference levels between bursts in the broadcast channel. In other words, the BCH is divided into different bursts within its superframe that are each sent with different levels of reuse. Different bursts can also be sent with different spatial parameters, for example, phase and amplitude between elements of a spatial diversity array. An F burst is sent by all base stations omni-directionally. A T burst is sent by all base stations using changes in the spatial parameters. The B bursts are sent by subsets of the base station with changes in the spatial parameters. This progression enhances user terminal reception while minimizing interference.

Process Flow

Figure 1:
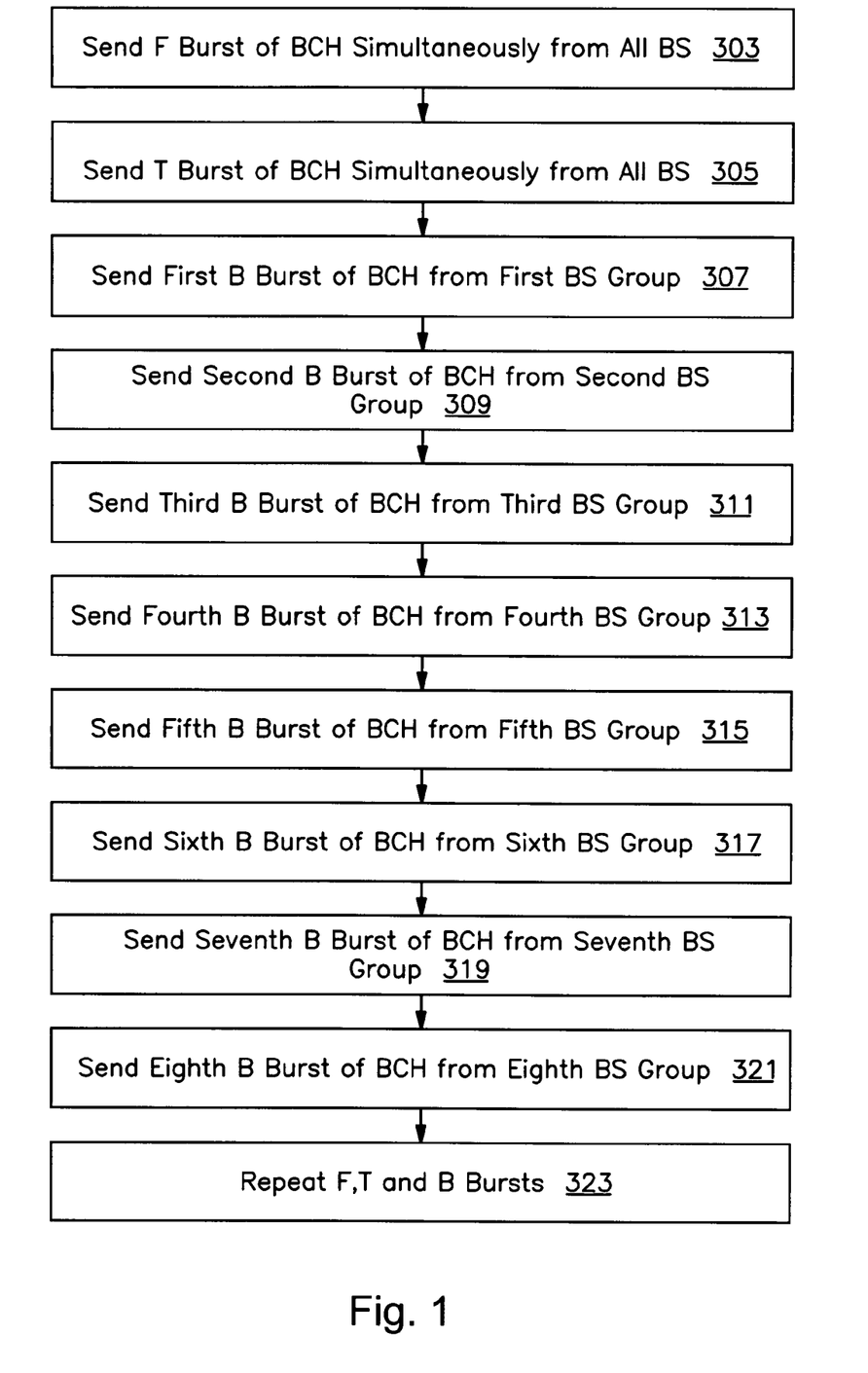
FIG. 1 is a flow chart showing one embodiment of the present invention.

FIG. 1 shows a process flow diagram for building and sending a sequence of broadcast channel (BCH) bursts in accordance with the present invention. This process is described in the context of several base stations (BS), in a network that includes many base stations, sending a BCH superframe to any subscriber stations or remote user terminals that may be within range of the base stations. The superframe includes bursts that are designated for use by different groups of the base stations. The designation of superframes, frames, slots and subslots used here is for convenient reference purposes only. Each burst described below could be characterized as a subslot of a slot, a slot of a frame or some portion of a superframe as in the example embodiment described.

Initially, all of the base stations simultaneously send an F burst of the BCH 303. In one embodiment, the F burst is an identical burst at every base station and is selected to allow user terminals to perform frequency correction on their BCH reception. In one embodiment, the F burst is transmitted as a pair of pure tones. This allows the tones to be slightly out of phase as they are received from two different base station and still be mixed by the receiver to obtain a reliable frequency reference. The base stations act almost as repeater stations so that the F burst penetrates the entire network. The particular content of the F burst is not significant but can relate to aspects of the BCH that are common to all base stations. In order to simultaneously send the F burst, the base stations can be synchronized in any of a variety of ways well-known in the art. A GPS signal can be used for example. The GPS signal has a benefit that it does not consume any frequency resources that could otherwise be used for traffic. Since the F burst is transmitted by all base stations at the same time, it corresponds to the highest level of interference added to the air waves, the communication resources of the system.

Following the F burst, the base stations all send a T burst 305. The base stations can be synchronized in the same way as with the F burst. In one embodiment, the T burst contains information regarding the base station color code (BSCC) of the transmitting base station, however, as with the F burst, information common to all base stations can be transmitted. The T burst can also be sent with varying spatial parameters. This may allow any user terminal that can receive the T burst simultaneously from different base stations to distinguish the different received bursts from each other. It also reduces the overall level of interference and noise injected into the system as compared to the F burst. In other embodiments, one of either the F burst or the T burst can be eliminated. While using both bursts configured as described helps the user terminal receive the next bursts, eliminating one or the other will further conserve frequency resources.

Following the T burst, the first B burst of the BCH is sent 307. The B burst is also sent using varying spatial parameters. There are several B bursts and they are divided up between the base stations so that only a portion of the base stations use each B burst. In one embodiment, each base station only uses one B burst. This means that the reuse factor on the B bursts is equivalent to the number of B bursts. In the present embodiment there are eight B bursts so the reuse factor is eight. Any other number of B bursts can be used depending on the needs of a particular system configuration, the number of base station and the tendency of the base stations to interfere with one another.

The B bursts can be allocated in any desired way. In order to minimize the level of interference added by the B burst, the B bursts can be allocated so that simultaneously transmitting base stations are as far apart from each other as possible. In one embodiment, this corresponds to the allocation of BSCC's. As a result, all of the BSCC's can be divided into eight groups and one of the eight B bursts can be assigned to each group of BSCC's. This approach has an added advantage that the BSCC can be used to identify B bursts from different base stations. Base stations simultaneously transmitting on the same B burst with the same BSCC will be a maximum distance apart.

Because B bursts from different base stations are easier to distinguish, they can better carry information that is specific to a particular base station. This information can include a particular base station's BSCC, transmit power, traffic load, available frequency resources and allocations, hopping sequences, and any other desired information.

After the first B burst, the second group of base stations send the second B burst 309. Then the third B burst of the BCH is sent from third BS group 311. The fourth B burst of the BCH is sent from the fourth BS group 313. The fifth B burst of the BCH is sent from the fifth BS group 315. The sixth B burst of the BCH is sent from the sixth BS group 317. The seventh B burst of the BCH is sent from the seventh BS group 319, and the eighth B burst of the BCH is sent from the eighth BS group 321. This completes the superframe. The superframe can then be repeated by sending the F, T and B bursts again 323 as long as the system is in operation.

The bursts are described as being of a certain number and being sent in a certain order, however, these factors can be modified to meet any particular system requirements. Since the frame is repeated, the precise ordering is less important, any type of burst can be sent first, B bursts can be interspersed between F and T bursts, and additional high or low reuse bursts can be added or removed from the superframe. The bursts may be sent immediately one after the other, or other bursts may be interspersed between the bursts. The bursts can be on a channel that is exclusively used for transmissions from base stations or it can be a duplexed channel used for both uplink and downlink. The number of B bursts can be varied to suit system needs as well. In addition, the particular designations, F, T, and B used here are not important. In the described example, the F burst is a shared burst with a high level of interference. The T burst is a shared burst with a lower level of interference, and the B burst is a base station-specific burst with the lowest level of interference. However, the variations in reuse, interference generation and transmitted information can be varied to suit any particular application.

Broadcast Channel Superframe

According to one embodiment of the present invention, communication sessions are initiated for each user terminal or remote terminal from the broadcast channel BCH which is transmitted as a burst from the base station to all potential user terminals. The BCH burst, unlike the TCH (traffic channel) bursts, is transmitted in segments in many different directions where user terminals are likely to be, the specific beam pattern parameters will depend on the network. The BCH communicates enough basic information to enable the UT to gain access to the network by transmitting a message of its own, for example a subsequent exchange of a CR (configuration request) and a CM (configuration message) between the base station and the user terminal.

The BCH also provides good frequency offset and timing update information to all user terminals, even when the BCH is not specifically directed toward any one user terminal in particular. The presently described embodiment has been selected in order to minimize the amount of information transmitted in the BCH as well as to minimize the bit rate. The broadcast channel information symbols provide the information needed for a user terminal to request a configuration message from the base station. They also provide information to guide user terminal handover decisions.

The broadcast logical channel (BCH) provides information that can be used by a UT (user terminal) to open a configuration channel (CCH) to the BS (base station). It also provides information to guide UT handover decisions for handovers to other base stations. The BCH logical channel can be located on a fixed RF (radio frequency) resource, e.g. a particular time slot and frequency, throughout the network of base stations. This fixed RF resource is, in one embodiment, dedicated to BCH and CCH, and is not used for RACH (random access channels) TCH (traffic channels) or other traffic. The other slots which are not dedicated to BCH and CCH can be used for RACH, TCH or any other purpose. In the present example, downlink slot 1 on an RF channel near the middle of the RF allocation is used for BCH and CCH functions. The particular choice of allocations will depend on the available resources and the requirements for overhead traffic.

In one embodiment, an RF allocation of 5 MHz is divided in frequency into 8 RF channels each of width 625 kHz. Each RF channel is divided in time into 5 ms frames. Each frame has 6 slots, 3 for receive and 3 for transmit, in a paired TDD (time-division duplex) arrangement. This particular specific structure has been found to be useful in a paired TDD system, however it can be adapted as desired for TDMA, FDD, and CDMA systems. For high noise environments or for increased robustness, the BCH can hop frequencies according to a predetermined scheme or be repeated on several different frequencies. In another embodiment, the BCH is on its own channel and RACH and other overhead are on a separate control channel. Alternately, one BCH can be provided on a constant frequency and a secondary BCH can be provided on another channel with hopping frequency. The particular details described here are not necessary to obtain the benefit of the invention and many variations are possible.

In detail, each 5 ms frame has the following sequence of fields, where the uplink slots are receive slots used for communication from a user terminal (UT) to a base station (BS) and the downlink slots are transmit slots used for communication from the BS to the UT.:

545 μs for uplink slot 1
545 μs for uplink slot 2
545 μs for uplink slot 3
10 μs guard time
1090 μs for downlink slot 1
1090 μs for downlink slot 2
1090 μs for downlink slot 3
85 μs guard time The BCH logical channel, the first downlink slot in the example above, carries three burst types, called F, T, and B. The F and T bursts in the present example have a reuse of one. All base stations transmit them on the same carrier at the same time. The B burst has a reuse of eight. The superframe structure can be simplified as the following sequence: F T B1 B2 B3 B4 B5 B6 B7 B8. One eighth of the base stations use broadcast slot B5, for example, while all the base stations use F and T.

The repeating superframe structure is shown in more detail is shown in Table 1 below. The superframe has a period of 20 frames.

The frame timing is established by the base stations that are in the area and transmitting on the RF carrier designated for the BCH. The carrier can be searched for or pre-programmed into the user terminals. The base stations, or base station if there is only one, can employ GPS or some other precise common timing reference to establish the frame timing. GPS timing offers the advantage that it is accurately synchronized and inexpensively available to all base stations. This allows the BCH to be shared by all the base stations with only a minimal guard time in the BCH between base stations. Precise timing also allows the remote terminals to make distance-based comparisons of the base stations for selection purposes.

Figure 4:
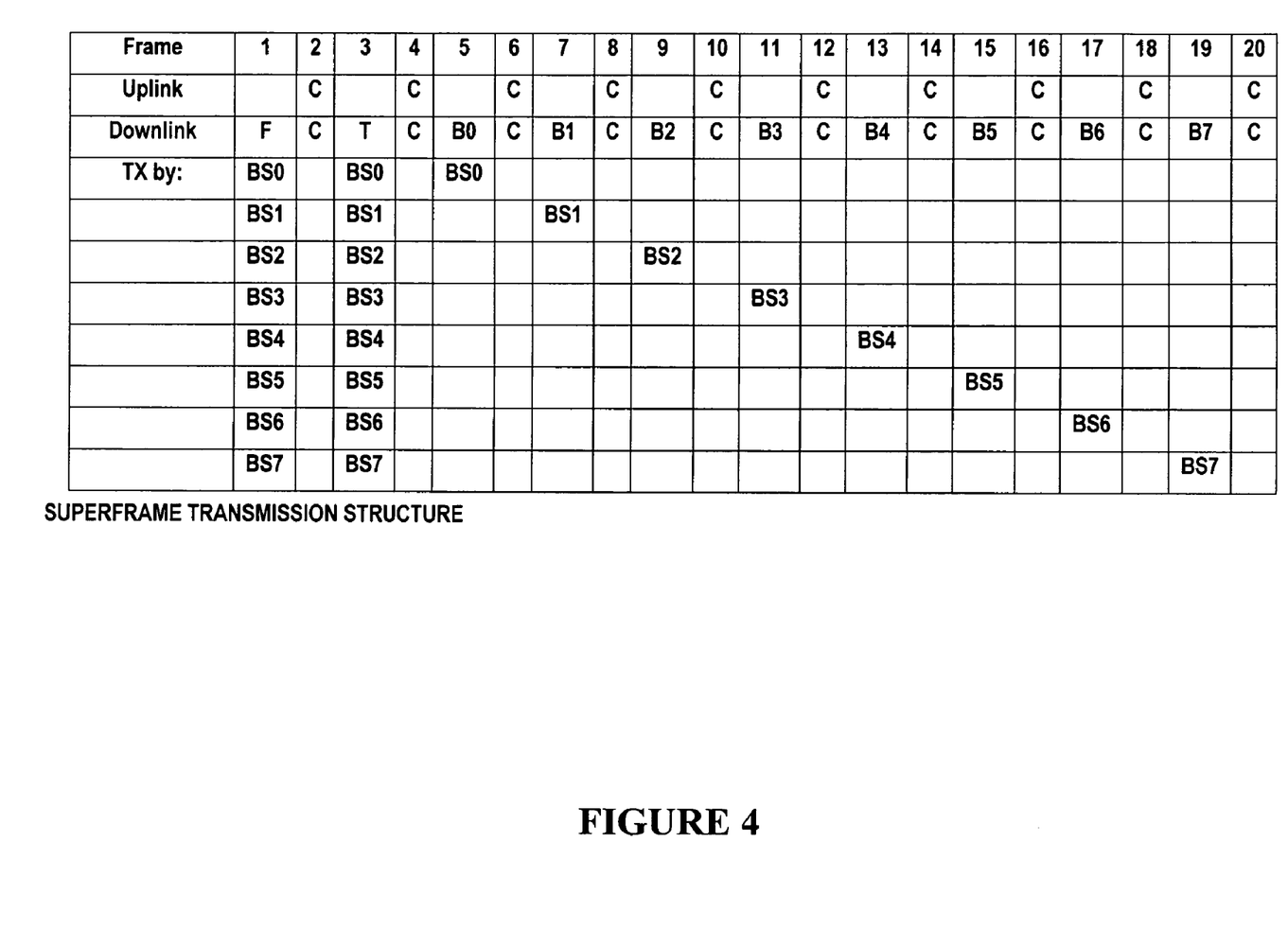
FIG. 4 is a table of superframe transmission showing the superframe of Table 1 and the corresponding BS groups, BS0 through BS7 that transmit for each frame of the superframe according to an embodiment of the invention.

The F and T frames, as described above, are occupied by all of the base stations on each repetition of the superframe. This is shown in the columns corresponding to frames 1 and 3 in the superframe of FIG. 4. This corresponds to a reuse factor of 1, as can be seen in FIG. 4 in which each BS, BS0 through BS7 transmits the F and T bursts. The B frames, labeled B0-B7, however, have a reuse factor of 8. The B frames are assigned to each base station based on its BSCC (Base Station Color Code), although any other assignment mechanism can be used, as can any other number of different B frames. This is shown in FIG. 4 in which the column for each frame 5, 7, 9, 11, 13, 15, 17, and 19 shows only transmitting BS. One benefit of assigning the B bursts is that the base stations that transmit simultaneously on the same burst will be separated from each other by at least one other base station. Accordingly, the identifiers BS0 through BS7 in FIG. 4 may each correspond to a single base station or to different groups of base stations.

In one embodiment, during a frame labeled Bn, only those base stations whose BSCC satisfy the equation, BSCC=n (mod 8), transmit a B burst at the same time. There are 64 base station color codes, numbered 0-63, leading to eight different color codes being simultaneously transmitted by the base stations in any one burst. So, for example, the base stations in group BS5 in FIG. 4 are those that have any of the eight different BSCC's corresponding to 5 (mod 8) or 5, 13, 21, 29, 37, 45, 53, 61. These base stations transmit their B burst in frame 15 or frame B5 of the superframe.

As a function of the BSCC, a base station frequency hops, broadcasts BCH, listens for uplink CR, and sends downlink CM in response to CR. The BSCC can also be used by base stations and terminals to ensure that messages transmitted to and from one base station are not confused with messages transmitted to and from a neighboring base station. Within a geographical region where radio transmissions overlap, the BSCC is uniquely assigned. No base station should be able to

TABLE 1

| Frame | 1 | 2 | 3 | 4 | 5 | 6 | 7 | 8 | 9 | 10 | 11 | 12 | 13 | 14 | 15 | 16 | 17 | 18 | 19 | 20 |
|---|---|---|---|---|---|---|---|---|---|---|---|---|---|---|---|---|---|---|---|---|
| Uplink | | C | | C | | C | | C | | C | | C | | C | | C | | C | | C |
| Downlink | F | C | T | C | B0 | C | B1 | C | B2 | C | B3 | C | B4 | C | B5 | C | B6 | C | B7 | C |

As shown in Table 1, even-numbered frames in the superframe are labeled "C" and carry CCH (configuration channel) bursts. Odd-numbered frames carry F, T, or B bursts. There are eight different versions of the B bursts indicated by the symbols B0-B7. The F, T and B bursts are used differently by the base stations of the system. All base stations transmit F and T bursts at the same time in the appropriate frame, once every superframe. The base stations are all synchronized to a GPS (Global Positioning System) receiver reference timing so that they can all transmit at almost exactly the same time.

routinely see user terminals that are communicating with a base station of the same color code. Likewise, no user terminal should be able to see two base stations that are assigned the same BSCC. A UT should never be in simultaneous communication range of two base stations that have the same BSCC. To help ensure that this occurs, BSCC's that differ by a multiple of 8 can be assigned to non-adjacent base stations. This ensures that the frames labeled B0-B7 in the superframe are received with minimal interference at a UT. The total number of base stations as well as the number of frames in a superframe, the of slots in a frame and the particular slots used for transmitting BCH bursts, CRs can be modified to suit particular applications.

Broadcast Channel F Burst

In the present example embodiment, the F burst contains:
10 μs of ramp-up, followed by
1056 μs of symbols f(1)-f(528), followed by
10 μs of ramp-down, followed by
14 μs of guard time.

The symbol period for all bursts (F, T and B) is 2 μs (500,000 symbols per second). Bursts can be transmitted in QPSK (Quarternary Phase Shift Keying), so that the nominal occupied bandwidth is 625 kHz.

The 1056 μs of symbols contains frequency correction symbols that follow a known predictable pattern. As observed at a user terminal, the frequency correction symbols can be a mixture of two complex tones.

Broadcast Channel T Burst

The T burst in this example consists of a short preamble followed by 8 consecutive QPSK signals of length 64 symbols each. Each repeated signal is generated from a code word, such as a Walsh-Hadamard code word, determined as a function of the base station color code (BSCC). The 8 repetitions are scrambled using a scrambling sequence that does not depend on the BSCC. Any scrambling code can be used. A pseudorandom sequence provides overall consistent waveform properties when modulated and can be generated using any of a variety of ways well-known in the art. In one embodiment, a scrambling sequence is generated from a congruential pseudorandom sequence generator.

The T burst in this example is made up of:
10 μs of ramp-up, followed by
32 μs of preamble r(1)-r(16), followed by
1024 μs of symbols t(1)-t(512), followed by
10 μs of ramp-down, followed by
14 μs of guard time.

For the T burst, the preamble is a known sequence of symbols that are adjacent in the QPSK modulation format. A variety of different sequences can be used. The preamble sequence provides some additional ramp-up and guard time. The particular sequence will depend on the modulation format, the quality of the RF channels and other possible intended uses.

The symbols t(1)-t(512) are a function of the BSCC (base station color code). The symbols t(1)-t(512) consist of 8 scrambled repetitions of the selected 64-bit Walsh-Hadamard or other type of code word using QPSK modulation. In one embodiment, each of the 8 scrambled repetitions is transmitted from the base station using a different beam pattern.

Broadcast Channel B Burst

Like the T burst, the B burst in this example consists of a short preamble followed by 8 consecutive QPSK signals of length 64 symbols each. The signals are also modulated code words, such as Walsh-Hadamard code words. A single code word of length 64 is selected as a function of the BCH payload, and is repeated 8 times. Each repetition is scrambled using a linear feedback shift register initialized using a function of the base station color code.

The spatial parameters, for example transmit weights, used to transmit the last four segments of the B burst are the same as the spatial parameters used to transmit the first four segments. Thus any phase change between, e.g., the 1st and 5th segments may be attributed to frequency offset. It's useful that there be a gap in time before the weights are repeated; a longer gap gives a more accurate frequency measurement but reduces the acquisition range of the frequency measurement. While, for example, the 1st and 5th segments of the B burst are transmitted with the same spatial parameters, they are not identical signals. They contain the same Walsh-Hadamard code word scrambled differently.

The B burst consists of:
10 μs of ramp-up, followed by
32 μs of preamble r(1)-r(16), followed by
1024 μs of symbols b(1)-b(512), followed by
10 μs of ramp-down, followed by
14 μs of guard time.

As with the T burst, the preamble for the B burst is a known sequence of symbols that are adjacent in the QPSK modulation format. A variety of different sequences can be used. This sequence helps the UT establish timing. The particular sequence will depend on the modulation format, the quality of the RF channels and other possible intended uses.

The symbols b(1)-b(512) are a function of the base station color code BSCC, the base station transmit power bsTxPwr, and the base station load bsLoad. These symbols can be derived in a variety of different ways. In one example, a six-bit message is defined as p(1)-p(6). The first four bits p(1)-p(4) carry the base station transmit power field bsTxPwr. The last two bits carry the bsLoad field.

The bsTxPwr field is interpreted by the UT as the per-antenna transmit power of the B burst. It can be encoded using the formula:

$$\text{bsTXPwr} = 3(p(1) + 2p(2) + 4p(3) + 8p(4)) \text{ dBm.} \qquad \text{i.}$$

Thus the bsTxPwr fields encodes a power from 0-45 dBm in 3 dB steps. The BStxPwr can be the effective isotropic radiated power of the broadcast message. This number indicates the power transmitted by the base station taking into account the number of amplifiers and diversity antennas available at the base station.

The bsLoad field, encoded in p(5) and p(6), gives an indication of the current traffic load of the base station. The four possible values {p(5),p(6)}={00,10,01,11} indicate light, medium, heavy, and very heavy loading, respectively. BSload is the load on the base station, used by the user terminal to determine how frequently to send random access messages and whether to attempt access. BSload is an indication of the amount of unused capacity the base station has. It can be different from the number of active registered subscribers because subscribers can require different amounts of traffic capacity. BSload represents the transmit and receive bit rates of each modem of the base station over a period of a few minutes measured against maximum possible loading.

To minimize, the data rate of BCH bursts still further, the BSCC and BSload can be removed from the BCH burst. The BCH burst then contains only training or synchronization and BStxPwr, the only information directly related to handover decisions. The user terminal can still distinguish and compare different base stations for selection and handover decisions based on timing of the received BCH bursts. The user terminal can also direct its message requesting access based on timing.

If there are only very few possible power levels for base stations in the system, for example two different transmit power levels, then the two power levels can be distinguished by providing two different training sequences. This allows the BSTxPwr bits to be eliminated. For a single base station system, or if all base stations transmit with the same power, the BSTxPwr bits can also be deleted. If there is only one base station, it is not necessary to evaluate path loss but only whether the signal can be received. The rest of the network information can be learned upon registration.

Having derived the six-bit sequence, this can be used to select a code word, such as a Walsh-Hadamard code word, that will be used to encode the information together with the BSCC as a 64-bit sequence, h(1)-h(64). The code word, h(1)-h(64), is scrambled and transmitted as the symbols b(1)-b(512).

The symbols b(1)-b(512) consist of 8 scrambled repetitions of the code word h(1)-h(64) with QPSK modulation. As with the T burst, the first four repetitions are transmitted from the base station using different beam patterns, and the last four repetitions use the same beam patterns as the first four in the same order. That is, repetitions 0 and 4 use the same beam pattern, repetitions 1 and 5 use the same beam pattern, and so on.

Noncoherent Modulation

The discontinuity in the BCH described above allows the BCH to be transmitted throughout the BS coverage area with minimal interference. However, it causes difficulties for the receiver. The modulation and coding structure of the broadcast burst therefore can be selected to aid the receiver in tolerating the phase and amplitude changes that occur between segments of the burst. This may be achieved in a number of ways.

One way is to include training or pilot data symbols in each segment of the BCH. By comparing the received signal to the known training or pilot symbols, the receiver can estimate the gain and phase of each segment. The gain and phase can then be corrected to some nominal value (such as 1) across the entire received burst. The corrected burst can then be processed ignoring the phase or gain changes.

A disadvantage of pilot symbols is that they expend signal energy that could otherwise be used to transmit information signals. The required number of symbols can be a very large fraction of the burst at the low SNRs (signal to noise ratios) at which a broadcast channel may operate.

Another way to facilitate phase changes between segments is differentially coherent signaling. DPSK (differential phase shift keying), for example, encodes information in the phase changes between successive symbols. If the receiver uses a differential receiver, the sudden phase changes that occur at segment boundaries will result in one or two errors, but the remainder of the segment will be processed correctly. Error correction encoding at the transmitter and error correction at the receiver can be used to repair these errors. However, differential signaling, such as DPSK, has several disadvantages. One disadvantage is the errors that will occur at segment boundaries, described above. Another disadvantage is that a differential receiver has lower performance.

The differential receiver attempts to track phase changes during a segment. In the BCH burst described above, the transmitter transmits each segment using a fixed beam pattern. As a result, the phase does not change significantly during the segment. The use of the differential receiver to receive a message that does not significantly change in phase is wasteful since it degrades performance during the reception of each burst segment.

Another way, which avoids pilot symbols and differential modulation, is to employ noncoherent modulation and coding. This approach does not require phase recovery at the receiver. One type of noncoherent modulation is orthogonal signaling, in which one from a set of M equal-energy orthogonal signals $\{x\_i(t): i=1-M\}$ is selected for transmission in each segment. To transmit a 6-bit message, for example, requires $M=2^6=64$ orthogonal signals.

The orthogonal signals may, for convenience, be defined by the rows of an orthogonal matrix H, where orthogonality means that H times its conjugate transpose $H^{\wedge}*$ is a scaled identity matrix. If the entries of H further take values +1 or −1, the signals may be transmitted using binary phase shift keying, which simplifies the transmitter and receiver. One such matrix H is the Walsh-Hadamard mentioned above.

There is a great variety of different noncoherent orthogonal signaling formats. Some formats also includes noncoherent signaling as a special case, such as PPM (pulse-position modulation) and FSK (frequency shift keying). While code word sets that are orthogonal and equal amplitude work very well for noncoherent signaling, these constraints can be greatly eased. The code words need only be sufficiently uncorrelated that they easily can be distinguished at the receiver. This will depend on the quality of the channel, of the transmitter and of the receiver.

Base Station Structure

In one embodiment as discussed above, the present invention is implemented in an SDMA (Spatial Division Multiple Access) radio data communications system. In such a spatial division system, each terminal is associated with a set of spatial parameters that relate to the radio communications channel between, for example, the base station and a user terminal. The spatial parameters comprise a spatial signature for each terminal. Using the spatial signature and arrayed antennas, the RF energy from the base station can be more precisely directed at a single user terminal, reducing interference with and lowering the noise threshold for other user terminals. Conversely, data received from several different user terminals at the same time can be resolved at lower receive energy levels. With spatial division antennas at the user terminals, the RF energy required for communications can be even less. The benefits are even greater for subscribers that are spatially separated from one another. The spatial signatures can include such things as the spatial location of the transmitters, the directions-of-arrival (DOAs), times-of-arrival (TOAs) and the distance from the base station.

Estimates of parameters such as signal power levels, DOAs, and TOAs can be determined using known training sequences placed in digital data streams for the purpose of channel equalization in conjunction with sensor (antenna) array information. This information is then used to calculate appropriate weights for spatial demultiplexers, multiplexers, and combiners. Techniques well known in the art, can be used to exploit the properties of the training sequences in determining spatial parameters. Further details regarding the use of spatial division and SDMA systems are described, for example, in U.S. Pat. Nos. 5,828,658, issued Oct. 27, 1998 to Ottersten et al. and 5,642,353, issued Jun. 24, 1997 to Roy, III et al.

(SDMA) technology can be combined with other multiple access systems, such as time division multiple access (TDMA), frequency division multiple access (FDMA) and code division multiple access (CDMA). Multiple access can be combined with frequency division duplexing (FDD) or time division duplexing (TDD).

Figure 2:
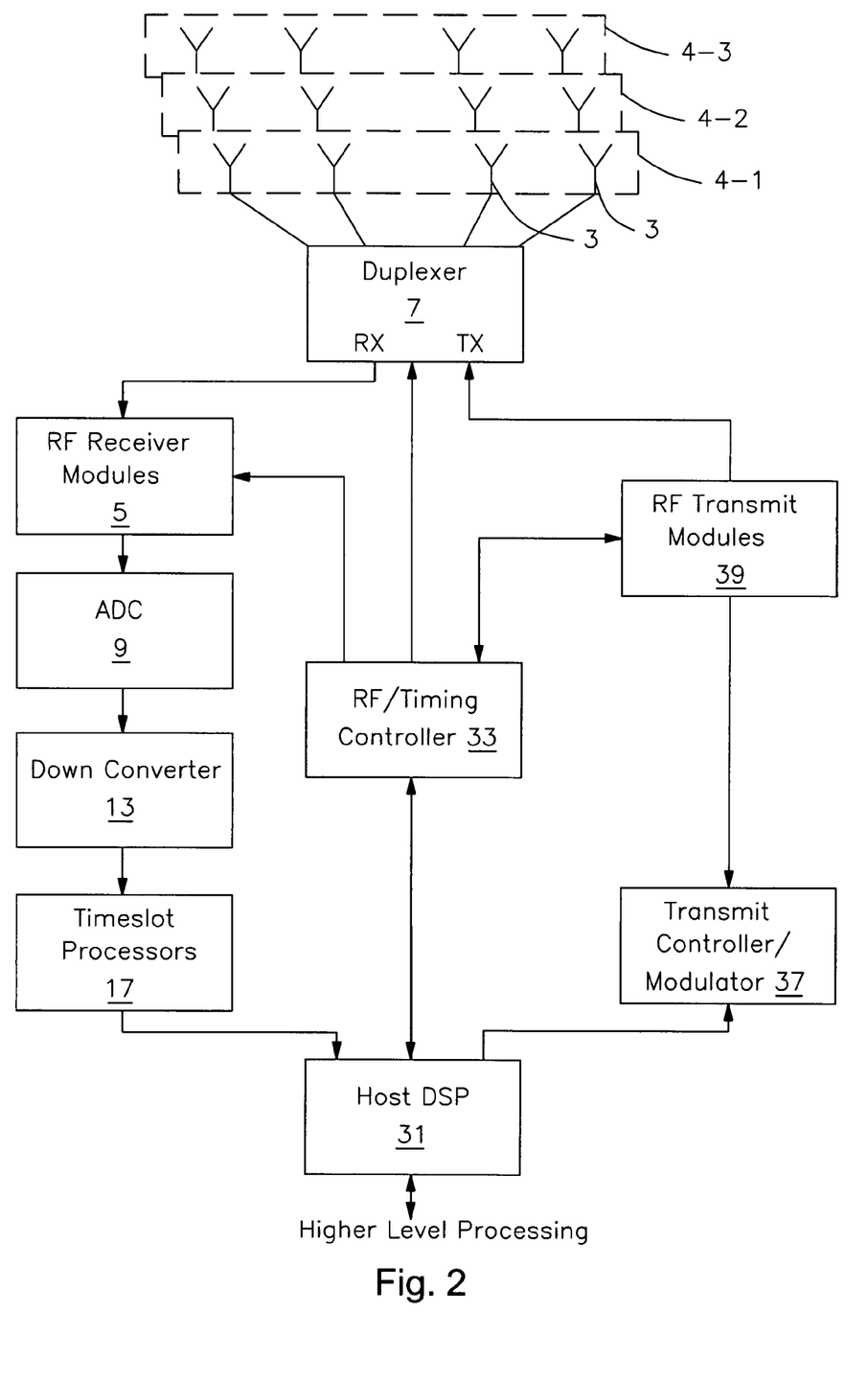
FIG. 2 is a simplified block diagram of a base station on which an embodiment of the invention can be implemented.

FIG. 2 shows an example of a base station of a wireless communications system or network suitable for implementing the present invention. The base station uses SDMA technology which can be combined with other multiple access systems, such as time division multiple access (TDMA), frequency division multiple access (FDMA) and code division multiple access (CDMA). Multiple access can be combined with frequency division duplexing (FDD) or time division duplexing (TDD). The system or network includes a number of subscriber stations, also referred to as remote terminals or user terminals, such as that shown in FIG. 3. The base station may be connected to a wide area network (WAN) through its host DSP 31 for providing any required data services and connections external to the immediate wireless system.

To support spatial diversity, a plurality of antennas 3 is used to form an antenna array 4, for example four antennas, although other numbers of antennas may be selected. Each antenna is an element of a four-element array 4. And a plurality of arrays are provided 4-1, 4-2, 4-3. The antenna elements may have a spacing of from one-quarter to four wavelengths of a typical carrier frequency while the arrays may be separated by ten or twenty wavelengths. The best spacing for spatial diversity will depend upon the particular frequencies involved, the physical installation and other aspects of the system. In many applications, the spacing between antenna elements of each array can be less than two wavelengths of the received signal. The spacing between antenna arrays can be more than two wavelengths of the received signal. In general, the spacing between elements in an array is selected to minimize grating lobes when transmissions from each element are coherently combined. In an alternative approach, the arrays are spaced apart so as to form a uniform array of elements. The distance between nearest elements in different arrays is the same as the spacing between elements within an array. As mentioned above, it is also possible for each array to have only a single element.

A set of spatial multiplexing weights for each subscriber station are applied to the respective modulated signals to produce spatially multiplexed signals to be transmitted by the bank of four antennas. The host DSP 31 produces and maintains spatial signatures for each subscriber station for each conventional channel and calculates spatial multiplexing and demultiplexing weights using received signal measurements. In this manner, the signals from the current active subscriber stations, some of which may be active on the same conventional channel, are separated and interference and noise suppressed. When communicating from the base station to the subscriber stations, an optimized multi-lobe antenna radiation pattern tailored to the current active subscriber station connections and interference situation is created. The channels used may be partitioned in any manner. In one embodiment the channels used may be partitioned as defined in the GSM (Global System for Mobile Communications) air interface, or any other time division air interface protocol, such as Digital Cellular, PCS (Personal Communication System), PHS (Personal Handyphone System) or WLL (Wireless Local Loop). Alternatively, continuous analog or CDMA channels can be used.

The outputs of the antennas are connected to a duplexer switch 7, which in a TDD embodiment, may be a time switch. Two possible implementations of the duplexer switch are as a frequency duplexer in a frequency division duplex (FDD) system, and as a time switch in a time division duplex (TDD) system. When receiving, the antenna outputs are connected via the duplexer switch to a receiver 5, and are converted down in analog by RF receiver ("RX") modules 5 from the carrier frequency to an FM intermediate frequency ("IF"). This signal then is digitized (sampled) by analog to digital converters ("ADCs") 9. Final down-converting to baseband is carried out digitally. Digital filters can be used to implement the down-converting and the digital filtering, the latter using finite impulse response (FIR) filtering techniques. This is shown as block 13. The invention can be adapted to suit a wide variety of RF and IF carrier frequencies and bands.

There are, in the example of GSM, eight down-converted outputs from each antenna's digital filter 13, one per receive timeslot. The particular number of timeslots can be varied to suit network needs. While GSM uses eight uplink and eight downlink timeslots for each TDMA frame, desirable results can also be achieved with any number of TDMA timeslots for the uplink and downlink in each frame. For each of the eight receive timeslots, the four down-converted outputs from the four antennas are fed to a digital signal processor (DSP) 31 an ASIC (Application Specific Integrated Circuit) or FPGA (Field Programmable Gate Array) (hereinafter "timeslot processor") for further processing, including calibration, according to one aspect of this invention. For TDMA signals, eight Motorola DSP56300 Family DSPs can be used as timeslot processors, one per receive timeslot. The timeslot processors 17 monitor the received signal power and estimate the frequency offset and time alignment. They also determine smart antenna weights for each antenna element. These are used in the SDMA scheme to determine a signal from a particular remote user and to demodulate the determined signal. In a WCDMA system, the channels may be separated using codes in an FPGA and then further processed separately perhaps using separate DSPs for different users. Instead of being timeslot processors the processors are channel processors.

The output of the timeslot processors 17 is demodulated burst data for each of the eight receive timeslots. This data is sent to the host DSP processor 31 whose main function is to control all elements of the system and interface with the higher level processing, which is the processing which deals with what signals are required for communications in all the different control and service communication channels defined in the system's communication protocol. The host DSP 31 can be a Motorola DSP56300 Family DSP. In addition, timeslot processors send the determined receive weights for each user terminal to the host DSP 31. The host DSP 31 maintains state and timing information, receives uplink burst data from the timeslot processors 17, and programs the timeslot processors 17. In addition it decrypts, descrambles, checks error correcting code, and deconstructs bursts of the uplink signals, then formats the uplink signals to be sent for higher level processing in other parts of the base station.

Furthermore DSP 31 may include a memory element to store data, instructions, or hopping functions or sequences. Alternatively, the base station may have a separate memory element or have access to an auxiliary memory element. With respect to the other parts of the base station it formats service data and traffic data for further higher processing in the base station, receives downlink messages and traffic data from the other parts of the base station, processes the downlink bursts and formats and sends the downlink bursts to a transmit controller/modulator, shown as 37. The host DSP also manages programming of other components of the base station including the transmit controller/modulator 37 and the RF timing controller shown as 33. The RF controller 33 reads and transmits power monitoring and control values, controls the duplexer 7 and receives timing parameters and other settings for each burst from the host DSP 31.

The transmit controller/modulator 37, receives transmit data from the host DSP 31. The transmit controller uses this data to produce analog IF outputs which are sent to the RF transmitter (TX) modules 39. Specifically, the received data bits are converted into a complex modulated signal, up-converted to an IF frequency, sampled, multiplied by transmit weights obtained from host DSP 31, and converted via digital to analog converters ("DACs") which are part of transmit controller/modulator 37 to analog transmit waveforms. The analog waveforms are sent to the transmit modules 39. The transmit modules 39 up-convert the signals to the transmission frequency and amplify the signals. The amplified transmission signal outputs are sent to antennas 3 via the duplexer/time switch 7. In a CDMA system, the signals may also be spread and scrambled using appropriate codes.

User Terminal Structure

Figure 3:
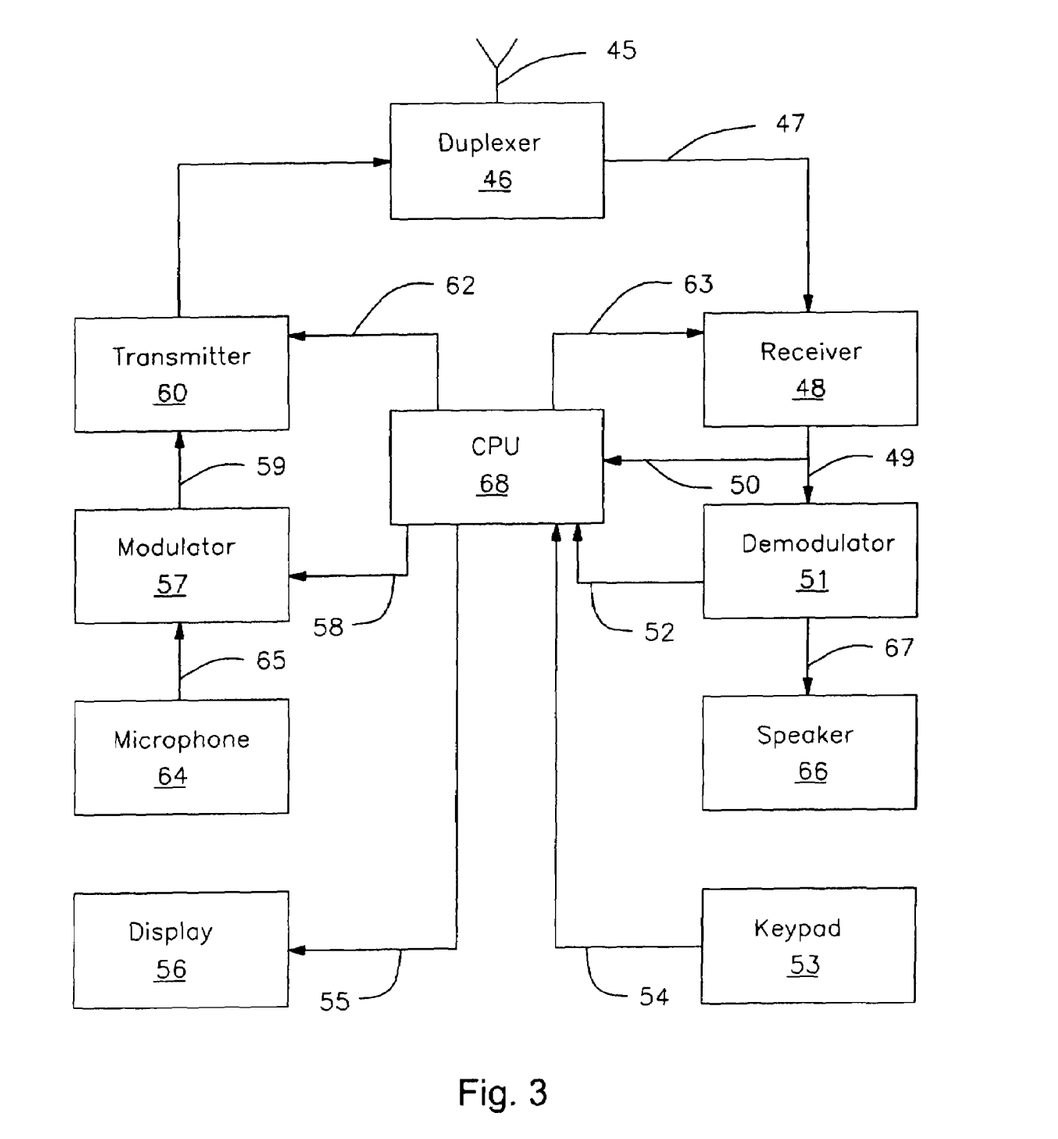
FIG. 3 is a block diagram of a remote terminal on which an embodiment of the invention can be implemented.

FIG. 3 depicts an example component arrangement in a remote terminal that provides data or voice communication. The remote terminal's antenna 45 is connected to a duplexer 46 to permit the antenna 45 to be used for both transmission and reception. The antenna can be omni-directional or directional. For optimal performance, the antenna can be made up of multiple elements and employ spatial processing as discussed above for the base station. In an alternate embodiment, separate receive and transmit antennas are used eliminating the need for the duplexer 46. In another alternate embodiment, where time division duplexing is used, a transmit/receive (TR) switch can be used instead of a duplexer as is well known in the art. The duplexer output 47 serves as input to a receiver 48. The receiver 48 produces a down-converted signal 49, which is the input to a demodulator 51. A demodulated received sound or voice signal 67 is input to a speaker 66.

The remote terminal has a corresponding transmit chain in which data or voice to be transmitted is modulated in a modulator 57. The modulated signal to be transmitted 59, output by the modulator 57, is up-converted and amplified by a transmitter 60, producing a transmitter output signal 61. The transmitter output 61 is then input to the duplexer 46 for transmission by the antenna 45.

The demodulated received data 52 is supplied to a remote terminal central processing unit 68 (CPU) as is received data before demodulation 50. The remote terminal CPU 68 can be implemented with a standard DSP (digital signal processor) device such as a Motorola series 56300 Family DSP. This DSP can also perform the functions of the demodulator 51 and the modulator 57. The remote terminal CPU 68 controls the receiver through line 63, the transmitter through line 62, the demodulator through line 52 and the modulator through line 58. It also communicates with a keyboard 53 through line 54 and a display 56 through line 55. A microphone 64 and speaker 66 are connected through the modulator 57 and the demodulator 51 through lines 65 and 67, respectively for a voice communications remote terminal. In another embodiment, the microphone and speaker are also in direct communication with the CPU to provide voice or data communications. Furthermore remote terminal CPU 68 may also include a memory element to store data, instructions, and hopping functions or sequences. Alternatively, the remote terminal may have a separate memory element or have access to an auxiliary memory element.

In one embodiment, the speaker 66, and the microphone 64 are replaced or augmented by digital interfaces well-known in the art that allow data to be transmitted to and from an external data processing device (for example, a computer). In one embodiment, the remote terminal's CPU is coupled to a standard digital interface such as a PCMCIA interface to an external computer and the display, keyboard, microphone and speaker are a part of the external computer. The remote terminal's CPU 68 communicates with these components through the digital interface and the external computer's controller. For data only communications, the microphone and speaker can be deleted. For voice only communications, the keyboard and display can be deleted.

General Matters

In the description above, for the purposes of explanation, numerous specific details are set forth in order to provide a thorough understanding of the present invention. It will be apparent, however, to one skilled in the art that the present invention may be practiced without some of these specific details. In other instances, well-known circuits, structures, devices, and techniques have been shown in block diagram form or without detail in order not to obscure the understanding of this description.

The present invention includes various steps. The steps of the present invention may be performed by hardware components, such as those shown in FIGS. 2 and 3, or may be embodied in machine-executable instructions, which may be used to cause a general-purpose or special-purpose processor or logic circuits programmed with the instructions to perform the steps. Alternatively, the steps may be performed by a combination of hardware and software. The steps have been described as being performed by either the base station or the user terminal. However, many of the steps described as being performed by the base station may be performed by the user terminal and vice versa. Furthermore, the invention is equally applicable to systems in which terminals communicate with each other without either one being designated as a base station, a user terminal, a remote terminal or a subscriber station. Thus, the present invention is equally applicable and useful in a peer-to-peer wireless network of communications devices using spatial processing. These devices may be cellular phones, PDA's, laptop computers, or any other wireless devices. Generally, since both the base stations and the terminals use radio waves, these communications devices of wireless communications networks may be generally referred to as radios.

In portions of the description above, only the base station is described as performing spatial processing using adaptive antenna arrays. However, the user terminals can also contain antenna arrays, and can also perform spatial processing both on receiving and transmitting (uplink and downlink) within the scope of the present invention.

Furthermore, in portions of the description above, certain functions performed by a base station could be coordinated across the network, to be performed cooperatively with a number of base stations. For example, each base station antenna array could be a part of a different base station. The base station's could share processing and transceiving functions. Alternatively, a central base station controller could perform many of the functions described above and use the antenna arrays of one or more base stations to transmit and receive signals.

The present invention may be provided as a computer program product, which may include a machine-readable medium having stored thereon instructions, which may be used to program a computer (or other electronic devices) to perform a process according to the present invention. The machine-readable medium may include, but is not limited to, floppy diskettes, optical disks, CD-ROMs, and magneto-optical disks, ROMs, RAMs, EPROMs, EEPROMs, magnet or optical cards, flash memory, or other type of media/machine-readable medium suitable for storing electronic instructions. Moreover, the present invention may also be downloaded as a computer program product, wherein the program may be transferred from a remote computer to a requesting computer by way of data signals embodied in a carrier wave or other propagation medium via a communication link (e.g., a modem or network connection).

Many of the methods are described in their most basic form, but steps can be added to or deleted from any of the methods and information can be added or subtracted from any of the described messages without departing from the basic scope of the present invention. It will be apparent to those skilled in the art that many further modifications and adaptations can be made. The particular embodiments are not provided to limit the invention but to illustrate it. The scope of the present invention is not to be determined by the specific examples provided above but only by the claims below.

It should also be appreciated that reference throughout this specification to "one embodiment" or "an embodiment" means that a particular feature may be included in the practice of the invention. Similarly, it should be appreciated that in the foregoing description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

What is claimed is:

1. A method comprising:
   sending a first burst of a broadcast channel from a transmitter of a broadcast channel radio subject to a first reuse factor;
   sending a second burst of the same broadcast channel from the same transmitter of the same broadcast channel radio subject to a second reuse factor;
   sending a third burst of the same broadcast channel subject to the first reuse factor and wherein the first burst contains frequency synchronization bits and the third burst contains timing synchronization bits.

2. The method of claim 1, wherein the first reuse factor is associated with a first level of interference from other broadcast channel radios and the second reuse factor is associated with a second lower level of interference from other broadcast channel radios.

3. The method of claim 1, wherein the first burst is sent in a first slot of a repeating frame and the second burst is sent in a second slot of the repeating frame.

4. The method of claim 3, wherein the repeating frame comprises a third slot, the method further comprising not sending a burst of the broadcast channel during the third slot.

5. The method of claim 3, wherein the slots are synchronized between other broadcast channel radios after a common timing reference.

6. The method of claim 5, wherein the common timing reference comprises a satellite timing signal.

7. The method of claim 1, wherein the second burst comprises a first segment using a first set of spatial parameters, a second segment using a second set of spatial parameters, and a third segment using the first set of spatial parameters.

8. The method of claim 7, wherein the first, second and third segments of the burst are transmitted consecutively.

9. The method of claim 7, wherein the spatial parameters comprise relative phases and amplitudes across elements of an antenna array.

10. The method of claim 1, wherein the first burst is for signal acquisition by receiving terminals and the second burst is for transmitting data regarding a particular transmitting terminal.

11. The method of claim 1, wherein the first burst contains timing data and the second burst contains data regarding a particular terminal.

12. The method of claim 1, wherein the first and second bursts are sent on the same channel with a time interval in between the bursts.

13. A storage device encoded with processor-executable instructions which, when executed by a processor, cause the processor to perform operations comprising:
   sending a first burst of a broadcast channel from a broadcast channel radio subject to a first reuse factor; and
   sending a second burst of the same broadcast channel from the same broadcast channel radio subject to a second reuse factor,
   wherein the second burst comprises a first segment using a first set of spatial parameters, a second segment using a second set of spatial parameters, and a third segment using the first set of spatial parameters, the first segment containing timing data for signal acquisition by receiving terminals and the second and third segments containing data regarding a particular transmitting terminal.

14. The device of claim 13, wherein the first reuse factor is associated with a first level of interference from other broadcast channel radios and the second reuse factor is associated with a second lower level of interference from other broadcast channel radios.

15. The device of claim 13, wherein the instructions for sending the first burst further comprise instructions which, when executed by the processor, cause the processor to perform further operations comprising sending the first burst in a first slot of a repeating frame and wherein the instructions for sending the second burst further comprise instructions which, when executed by the processor, cause the processor to perform further operations comprising sending the second burst in a second slot of the repeating frame.

16. The device of claim 15, wherein the repeating frame comprises a third slot, the instructions further comprising instructions which, when executed by the processor, cause the processor to perform further operations comprising not sending a burst of the broadcast channel during the third slot.

17. The device of claim 15, further comprising instructions which, when executed by the processor, cause the processor to perform further operations comprising synchronizing the slots between other broadcast channel radios after a common timing reference.

18. A cellular base station comprising:
   a timing reference to synchronize transmissions with other base stations;
   a processor to generate a broadcast channel frame, the frame comprising at least three bursts; and
   a transmitter to send a first burst of the broadcast channel subject to a first reuse factor, a second burst of the same broadcast channel subject to a second reuse factor, and a third burst of the same broadcast channel, subject to the first reuse factor, the first burst containing frequency synchronization bits and the third burst containing timing synchronization bits.

19. The base station of claim 18, wherein the timing reference comprises a satellite timing signal receiver.

20. The base station of claim 18, wherein the first reuse factor is associated with a first level of interference from other base stations and the second reuse factor is associated with a second lower level of interference from other base stations.

21. The base station of claim 18, wherein the first burst is for signal acquisition by receiving terminals and the second burst is for transmitting data regarding a particular transmitting terminal.

22. The base station of claim 18, wherein the first burst contains timing data and the second burst contains data regarding a particular terminal.

23. The base station of claim 18, wherein the transmitter sends the first and second bursts on the same channel with a time interval in between the bursts.

24. A method comprising:

sending a first burst of a broadcast channel simultaneously from a first base station and from a second base station;

sending a second burst of the same broadcast channel from only the first base station after sending the first burst; and sending a third burst of the same broadcast channel from only the second base station after sending the second burst, wherein the first burst contains information about the broadcast channel, wherein the second burst contains information about the first base station, and wherein the third burst contains information about the second base station.

25. The method of claim 24, wherein the first burst is sent in a first slot of a repeating frame and the second burst is sent in a second slot of the repeating frame.

26. The method of claim 25, wherein the repeating frame comprises a third slot, the method further comprising not sending a burst of the broadcast channel during the third slot.

27. The method of claim 24, wherein the bursts are synchronized between the first base station and the second base station after a common timing reference.

28. The method of claim 24, wherein the second burst comprises a first segment using a first set of spatial parameters, a second segment using a second set of spatial parameters, and a third segment using the first set of spatial parameters.

29. The method of claim 28, wherein the first, second and third segments of the burst are transmitted consecutively.

30. The method of claim 28, wherein the spatial parameters comprise relative phases and amplitudes across elements of an antenna array.

31. The method of claim 28, wherein the first segment is for signal acquisition by receiving terminals and the second and third segments are for transmitting data regarding a particular transmitting terminal.

32. The method of claim 28, wherein the first segment contains timing data and the second and third segments contain data regarding a particular broadcast channel transmitter.

* * * * *